United States Patent [19]

Bezin et al.

[11] Patent Number: 4,982,070
[45] Date of Patent: Jan. 1, 1991

[54] SYSTEM FOR MANAGING PAID-FOR VEHICLE PARKING BY MEANS OF CARDS

[75] Inventors: Jean L. Bezin, Devesey, France; Yves Eonnet, Virginia Beach, Va.

[73] Assignee: Schlumberger Industries, Montrouge, France

[21] Appl. No.: 281,774

[22] Filed: Dec. 8, 1988

[30] Foreign Application Priority Data

Dec. 8, 1987 [FR] France .................. 87 17041

[51] Int. Cl.⁵ .................................. G06K 15/00
[52] U.S. Cl. .................................. 235/378; 235/380; 235/384; 235/492
[58] Field of Search ............... 235/378, 380, 384, 492

[56] References Cited

FOREIGN PATENT DOCUMENTS 2583186 10/1987 France .

Primary Examiner—Harold J. Pitts
Attorney, Agent, or Firm—Frishauf, Holtz, Goodman & Woodward

[57] ABSTRACT

The system comprises a parking terminal (20) having an electronic memory and a card reader (26), a portable terminal (22) carried by a parking checker, a card (10) having a magnetic track containing a confidential identification number, and a label (14), for sticking to the windshield of a vehicle, with said label bearing information (16) which is unambiguously related to the information stored in the card.

11 Claims, 2 Drawing Sheets

SYSTEM FOR MANAGING PAID-FOR VEHICLE PARKING BY MEANS OF CARDS

The present invention relates to a system for managing paid-for vehicle parking by means of cards.

More precisely, the present invention provides a system for managing paid-for vehicle parking in which drivers can pay for the right to park by means of a card having a magnetic or an electronic memory, and in which checkers (i.e. people employed to check on parking) are provided with portable terminals for verifying whether parked vehicles are legitimately parked or not.

BACKGROUND OF THE INVENTION

One such system has already been described in French Pat. No. 2 583 186 granted Oct. 20, 1987 and entitled "A system for managing paid-for parking". According to this prior patent, parking is checked on the basis of two items of information which a driver is required to insert in a parking terminal at the beginning of the period during which the vehicle is parked. The first item of information is a vehicle identification number, e.g. the number of the parking space occupied by the vehicle, or preferably, the registration number of the vehicle or a portion thereof. The second item of information is the expiry time for authorized parking. When a checker desires to check that a vehicle is legitimately parked, all the checker has to do is enter the vehicle registration number or the number of the parking space occupied by the vehicle into a portable terminal. In one of various different possible ways, the portable terminal compares the number entered with numbers it contains in its memory and it verifies whether the corresponding expiry time for legitimate parking has elapsed or not.

As clearly explained in the above-mentioned patent, this system makes it possible to considerably simplify checking on paid-for vehicle parking.

However, the nature of the information used for identifying the vehicle can give rise to various drawbacks in some cases. When this information is constituted by the number of a parking space, said spaces must be marked out and numbered in a manner which is still legible after a driver has parked a vehicle in the parking space. This is not always easily done. When the identification is constituted by the vehicle registration number, some drivers may object to a parking terminal storing information over some unverifiable period of time specifying that such-and-such a vehicle was parked at such-and-such a time in such-and-such a location, even when the parking was legitimate. In other words there is a potential problem with invasion of privacy.

An object of the present invention is to provide a system for managing paid-for vehicle parking which retains the advantages of the system described in the above-mentioned patent, but which identifies vehicles without making use either of vehicle registration numbers or of the numbers of parking spaces occupied by vehicles.

SUMMARY OF THE INVENTION

The present invention provides a system for managing paid-for vehicle parking by means of cards, the system comprising:

at least one portable card carried by a vehicle driver, the card including a data medium having identification information specific to the card written therein, and also having a zone for storing successive credit balances;

at least one parking terminal for use in checking a plurality of parking spaces, said terminal including means for reading information from and for writing information to said data medium, means for entering information into said terminal concerning the expiry time of authorized parking as a function of prepayment performed by said driver, means for storing pairs of data items corresponding to the identification information and to the corresponding expiry time of authorized parking, and first means for delivering current time information;

at least one display means suitable for being fixed on a vehicle and including identification data, said data being related unambiguously to said identification information carried in said information medium; and at least one portable terminal carried by a checker for checking on parking, the terminal including means accessible to the checker for entering said identification data of a vehicle parked in one of said parking spaces, said system further including means for comparing the identification data as entered with the identification information as stored, means for comparing the stored information concerning the expiry time of authorized parking with said current time information, and processor means for processing the results of said comparisons in order to cause a warning signal to appear on said portable terminal when a vehicle whose identification information has been inserted into the portable terminal is illicitly parked.

As a result, the memory of a parking terminal never contains information which is directly traceable to a vehicle and thus to its owner. The identification information contained in the data medium of the card is completely independent of the vehicle and of its owner.

Another object of the invention is to provide a system for managing paid-for vehicle parking of the above-defined type in which drivers only pay for the parking time actually used by their vehicles.

To do this, said parking terminal includes means for comparing the time at which a card is inserted into the terminal with said stored information relating to expiry times of authorized parking and for comparing the associated identification information stored therewith with the identification information written in the card, and means for processing said comparisons in order to change the balance stored in said card providing the identification information of said card corresponds with properly stored identification information and providing the corresponding expiry time of authorized parking is later than the time of insertion.

BRIEF DESCRIPTION OF THE DRAWING

Implementations of the invention are described by way of example with reference to the accompanying drawing, in which.

MORE DETAILED DESCRIPTION

Figure 1A:
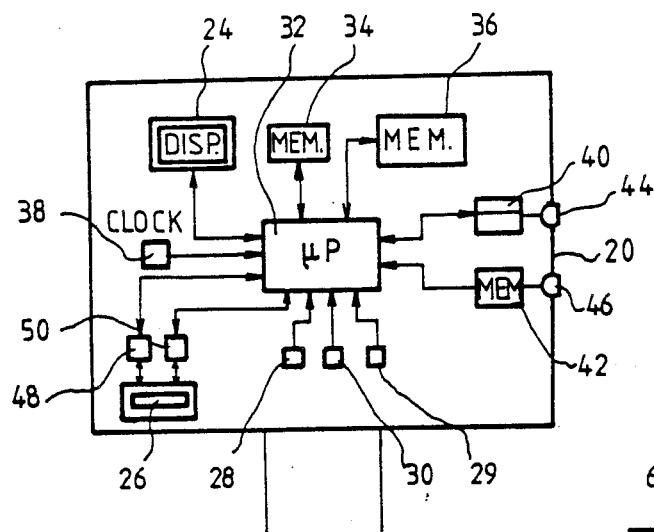
FIG. 1 shows the various portions of a system in accordance with a first implementation of the invention.
Figure 1B:
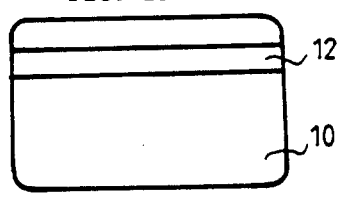
Figure 1C:
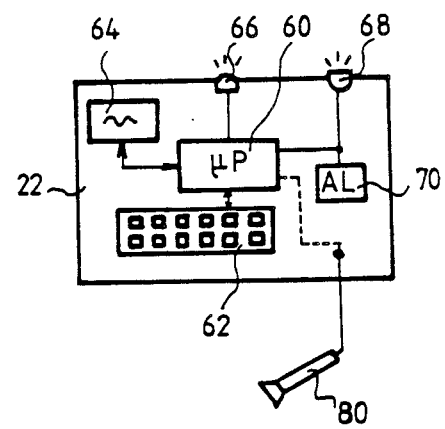
Figure 1D:
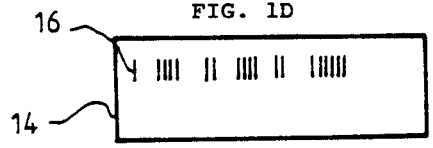

As mentioned above, a portion of the present invention is already described in French Pat. No. 2 583 186.

The entire description of said earlier patent should be considered as being an integral portion of the present description.

Reference is made initially to FIG. 1 for describing a first implementation of the invention.

When a car driver desires to pay parking fees by means of a card, the driver buys a card 10 from the organization managing the parking space, and in the present example, the card is provided with a magnetic track 12. The driver simultaneously obtains a label 14 which is associated with the card 10.

The magnetic track 12 of the card 10 has already received an identification number II in encoded form and a credit balance which corresponds to the amount of paid by the driver when buying the card. The label 14 has identification data on one of its faces, e.g. in the form of a bar code 16. The identification data DI on the label 14 corresponds to the identification number II stored in the card 10 by means of a secret algorithm ALG, said algorithm providing unambiguous correspondence between the identification numbers II of various different cards 10 and the identification data DI written on the corresponding different labels 14 associated with the cards 10. When a card 10 and its associated label 14 are given to a driver, the driver is told that the label 14, which may be sticky label, should be fixed behind the windshield of the vehicle, like a road tax disk or sticker.

The management system also includes a parking terminal 20 which is disposed in the vicinity of a set of parking spaces which it is used to check. Finally, the system includes a portable terminal 22 which is carried by a checker employed to check on parking.

The parking terminal 20 has a front face which essentially includes a display 24, a magnetic card reader 26, a button 28 for specifying a parking duration, a cancel button 29, and a confirm button 30.

FIG. 1 also shows the main circuits to be found in a parking terminal 20, at least insofar as they are applicable to the present invention. These circuits include a microprocessor 32 associated with a program memory 34 and a data memory 36, a time base 38 which delivers current time data, an infrared signal transmitter 34, and an infrared signal receiver 46 associated with a buffer memory 42. The microprocessor 32 is also used for controlling the display device 24 and the read head 48 and the write head 50 of the magnetic card reader 26. Finally, the microprocessor 32 receives the signals generated by the buttons 28, 29, and 30 whenever they are actuated by a driver.

A portable terminal 22 for a checker includes a microprocessor 60, an input keypad 62, and a display device 64. It also includes an infrared signal transmitter 66 under the control of the microprocessor 60 and an infrared signal receiver 68 whose output is connected to the microprocessor 60 and to an alarm circuit 70 for causing special information to appear when a vehicle being checked is not legitimately parked.

The portable terminal 22 is associated with an optical reader 80, e.g. a bar code reader, and the reader is connected to the terminal in such a manner as to enable the microprocessor 60 to receive information read by the reader 80.

The system shown in FIG. 1 is now described. In order to pay a parking fee for a vehicle, a driver inserts a card 10 into the reader 26 of the parking terminal 20. When the presence of a card is detected, a program ST stored in the memory 34 is run under the control of the microprocessor 32. The reader 26, 48 reads the identification information II and the credit balance remaining in the card.

The program ST compares the identification information II read from the card with identification information stored in its data memory 36. If the newly read-in identification information is not already present in the machine, then it is assumed that the card holder seeks to pay for a period of parking time. This causes a new program STA to be run. Otherwise, if the identification information II read from the card appeared in the information stored in the data memory, then the program ST reads the expiry time information for authorized parking HLSA which is associated therewith and compared this information with the current time information provided by the clock signal 38. If the information HLSA corresponds to a time which has already elapsed, the program ST again assumes that the driver who has inserted the card seeks to pay for a new period of parking. The program STA is therefore run. Otherwise, if the time corresponding to the information HLSA has not already expired, the program ST interprets this as meaning that the driver seeks to terminate the paid-for parking time before it has completely elapsed and wishes to recover the excess parking time already paid for. In this case, a different program STR is run.

We begin by assuming that a driver wishes to pay for a new period of parking, i.e. that the program STA is run. The display 24 displays a message inviting the driver to enter the desired parking duration. This data is entered by means of the button 28 with each press on the button corresponding, for example, to 15 minutes of parking. The program STA then calculates the time at which authorized parking will expire HLSA and the corresponding fee. The program STA also compares the calculated fee with the remaining balance as read initially from the card. If the balance is sufficient, nothing happens. If the balance is too small, the display 24 indicates the time limit at which parking will expire given the balance available. The driver then has the option of abandonning the operation by pressing the cancel button 29, in which case the card is merely returned. Otherwise, the driver may press the confirm button 30 to tell the machine that the transaction is confirmed. In this case, the microprocessor 32 calculates the new balance on the basis of the old balance. The write head 50 of the reader 26 is then controlled to erase the old balance from the magnetic track 12 of the card and to replace it with the new balance. As a precaution, a transaction number may also be recorded on the magnetic track together with the parking fee involved, the date of the operation together with the time at which parking expires, and information indicating that overpayment has not been recovered, should that be the case. The driver can then remove the card from the reader 26.

Simultaneously, the program STA writes the identification information II read from the card into the data memory 36 together with the corresponding calculated expiry time information HLSA. As a precaution, the data memory may also receive the transaction number, the date of the operation, and the amount paid. The memory 36 thus comprises a table of pairs of information items, with each pair comprising an identification item II and the corresponding expiry time information HLSA.

When a driver seeks to terminate vehicle parking, two situations may arise: either the paid-for parking time has already expired and the driver is already parked illicitly, or else the time has not expired and the driver can recover the overpayment.

In order to recover overpayment, the driver inserts the card 10 into the reader 26. As described above, inserting the card causes the program ST to run. When the identification information read from the card is compared with the identification information II already stored in the memory 36, it is observed that the information on the card is already stored in the memory and that it is associated with an expiry time HLSA which has not expired. The program STR is therefore run by the microprocessor 32. The program STR calculates the time interval between the current time information provided by the time base 38 and the expiry time information HLSA, and then converts this unused parking time into an amount of money. This money corresponding to overpayment is then credited to the card 10. To do this, the card calculates a new balance and then causes the write head 48 to erase the old balance from the magnetic track 12 and write the new balance instead. In addition, information specifying that overpayment (if any) has not been recovered is erased.

The pair of items constituted by the identification information II and the expiry time HLSA is then erased from the memory 36 and all of the data relating to the transaction is copied into a special zone 36' of the memory 36.

The memory 36 per se therefore contains only those pairs of information items II and HLSA which correspond to vehicles for which no request has been made to reimburse overpayment.

The checker checks on parked vehicles as follows. The checker carries the portable terminal 22 together with its optical reader 80. For each vehicle carrying a label 14, the checker uses the reader 80 to pick up the identification data DI. This data is applied to the microprocessor 60 which implements an algorithm ALG. The program decodes the identification data ID using the algorithm ALG and generates identification information II as stored in the card 10 belonging to the vehicle driver. Thereafter, the microprocessor 60 controls the transmitter 66 in order to send an infrared signal corresponding to the identification information II. The infrared signal is received by the receiver 46 and converted into a digital value II which is temporarily stored in the memory 42. This reception causes a program COMP to be run under the control of the microprocessor 32. The program COMP compares the identification information stored in the memory 42 with the identification information II contained in the memory 36, per se. If the information II does not appear therein, then the driver has not paid for parking, or else the driver has paid and has subsequently had overpayment reimbursed without also removing the vehicle from the parking space. In either case the vehicle is illegitimately parked. The microprocessor 32 controls its transmitter 44 to send an infrared signal indicating that the parking is illegitimate. This signal is received by the receiver 68 of the portable terminal 22 and causes an alarm 70 to be activated. Otherwise, if the identification information II is indeed to be found in the memory 36, per se, then the corresponding vehicle is legitimately parked.

It can be seen from the above description that the driver only pays for the time for which a vehicle is indeed parked, providing the driver begins by paying for a period of parking which is longer than the period actually used, and obtains reimbursement for the overpayment.

The way in which the time at which authorized parking expires HLSA is defined may be modified as follows: when the driver inserts the card 10 into the reader 26, the parking duration is automatically assumed by the program STA to be equal to the maximum authorized parking duration, e.g. two hours. The program STA calculates the fee corresponding to said maximum time and compares it with the balance stored in the card. If the balance is sufficient, the microprocessor 32 causes the display 24 to display the time at which authorized parking will expire. The driver then presses the confirm button 30 and the program STA continues as described above. If the balance is insufficient, the program STA calculates the maximum duration for which parking may be authorized. The display 24 then indicates the time at which such authorized parking will expire. The driver may then press the confirm button 30 or else the cancel button 29 in which case the card is merely returned.

Figure 2A:
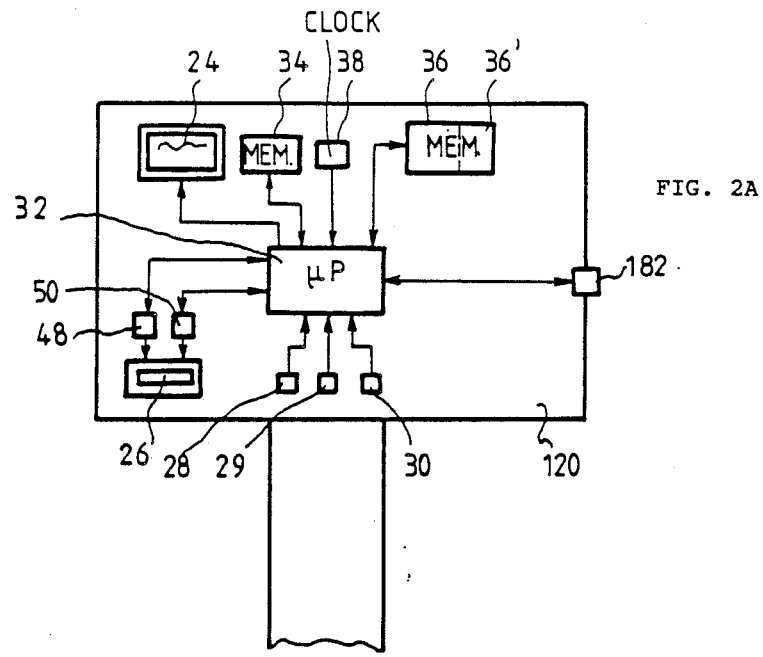
FIG. 2 shows a variant implementation of the invention.
Figure 2B:
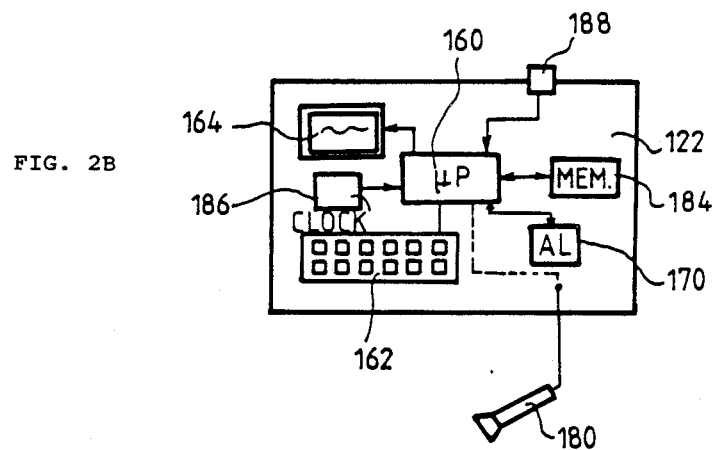

In the implementation above, the identification information of a vehicle is entered into a portable terminal 22 by a checker and this information is transmitted by infrared signals to the parking terminal 20 where it is compared with all of the identification information stored in the memory 36 per se. FIG. 2 shows a second implementation of the system for managing parking in which the comparison is performed in the portable terminal 22. In this second implementation, the label 14 and the card 10 are identical to those described with reference to FIG. 1, and they therefore do not reappear in FIG. 2.

The parking terminal, referenced 120 in FIG. 2, includes the same items as the terminal 20 of FIG. 1 except that it no longer includes the transmitter 44, the receiver 46, and the memory 42. In contrast, the parking terminal 120 includes an external connector 182 connected to the microprocessor 32.

The portable terminal of FIG. 2 (referenced 122) includes a microprocessor 160, a display 164, a keypad 162, and an alarm circuit 170 for processing an alarm signal. It also includes a data memory 184 connected to the microprocessor 160, and a clock circuit 186 for providing the microprocessor 160 with information concerning the current time. The portable terminal 122 also includes an external connector terminal 188 connected to the microprocessor 160. Finally, an optical reader 180 is connected to the terminal 122 in order to be connected to the microprocessor 160.

The FIG. 2 implementation operates as follows. The operations performed by the driver are exactly the same as those described with reference to the implementation of FIG. 1. The only changes relate to the way in which the portable terminal 122 is used by the checker. Prior to doing the rounds of the parked vehicles, the checker connects the portable terminal 122 to the parking terminal 120 by means of the connectors 182 and 188. This temporary connection may be performed by means of wires or by any other appropriate means. While this connection is established, all of the II and HLSA pairs of information stored in the memory 36 per se are transferred into the data memory 184 of the terminal 122. Once transfer has been completed, the terminal 122 is disconnected from the terminal 120 and the checker begins doing the rounds of the vehicles.

At each vehicle being checked, the reader 180 is used to enter the identification data on the label 14 into the terminal 122. The microprocessor 160 implements the ALG program in order to convert the identification data as read into the corresponding identification information II. Thereafter the microprocessor 160 runs a comparison program COMPA. Initially, the identification information as read from the label is compared with the identification information stored in the memory 184. If the identification information read from the label is not in the memory 184, then the corresponding vehicle is illegitimately parked and the microprocessor 160 activates the alarm circuit 170. Otherwise, the program COMPA reads the HLSA information associated with the identification information. The HLSA information is compared with the current time information delivered by the clock 186. If the authorized parking time has expired, (optionally including a certain period of grace), then the vehicle is illegitimately parked and the alarm indicator 170 is activated. Otherwise the vehicle is legitimately parked and the checker moves onto the next vehicle.

Naturally, numerous modifications can be made to the implementations shown in FIGS. 1 and 2 without going beyond the scope of the invention. The magnetic cards 10 can be replaced by cards having electronic memories. The identification information is then write protected and cannot be modified, whereas the zone in which the balance is written can be read from and written to freely. Naturally, the magnetic card reader 26 would then be replaced by a reader for electronic cards.

In the above-described implementations, the identification data carried by the label 14 placed on the vehicle is written in the form of a bar code and is read by means of an optical reader 80 or 180. It is also possible for this data to be written in the clear. The checker reads the identification data and keys it into the portable terminal 22 or 122 by means of the keypad 62 or 162. It is also possible to provide both ways of displaying the identification data so as to enable vehicles to be checked even if the optical reader is faulty.

Naturally, the label 14 could alternatively have the identification data recorded in magnetic form, in which case the reader associated with the portable terminal would be a magnetic reader.

It should also be added that in pay parking areas including a large number of parking spaces, it is convenient to install a plurality of parking terminals such as the terminal 20 or the terminal 120. In order to make it possible to check on vehicle parking as described above, it would be necessary for each parking terminal to be associated with a well-defined set of parking spaces. However, this may be inconvenient for drivers. This inconvenience can be avoided by enabling each parking terminal to read from each card the time at which authorized parking expires and also the fact that the card has not been inserted into some other terminal in order to reimburse overpayment. Processing such information makes it possible to reimburse overpayment to a driver, but it does not allow parking to be managed properly as described above. In order to allow both aspects of the invention to be performed simultaneously, it is possible to interconnect a plurality of different parking terminals. The purpose of such an interconnected network of parking terminals is to cause all new II, HLSA information pairs inserted in the memory 36 of any of the terminals to be transferred into the memory 36 of all of the other terminals in the network. Thus, at any given instant, the memory 36 in each terminal contains pairs of information items relating to all of the vehicles parked in a given area. The checker can then load the portable terminal from any one of the parking terminals in the network (FIG. 2) or can interchange infrared signals between the portable terminal and that one of the parking terminals which happens to be nearest. A system for interconnecting parking terminals is described in French patent application No. 2 584 515 published Jan. 9, 1987. The text of that earlier application should be considered as forming an integral portion of the present description.

What is claimed is:

1. A system for managing paid-for vehicle parking by means of cards, the system comprising:
    at least one portable card carried by a vehicle driver, the card including a data medium having identification information specific to the card written therein, and also having a zone for storing successive credit balances;
    at least one parking terminal for use in checking a plurality of parking spaces, said terminal including means for reading information from and for writing information to said data medium, means for entering information into said terminal concerning the expiry time of authorized parking as a function of prepayment performed by said driver, means for storing pairs of data items corresponding to the identification information and to the corresponding expiry time of authorized parking, and first means for delivering current time information;
    at least one display means suitable for being fixed on a vehicle and including identification data, said data being related unambiguously to the identification information carried in said information medium; and
    at least one portable terminal carried by a checker for checking on parking, the terminal including means accessible to the checker for entering said identification data of a vehicle parked in one of said parking spaces, said system further including means for comparing the identification data as entered with the identification information as stored, means for comparing the stored information concerning the expiry time of authorized parking with said current time information, and processor means for processing the results of said comparisons in order to cause a warning signal to appear on said portable terminal when a vehicle whose identification information has been inserted into the portable terminal is illicitly parked.

2. A system according to claim 1, in which said identification data displayed on said display means is related to the identification information by a coding algorithm, with said display means being suitable for being fixed in visible manner on said vehicle.

3. A system according to claim 1, in which said identification data is displayed in the form of a graphic code, and said means for entering said identification data into said portable terminal include an optoelectrical converter for converting the graphic code into electrical signals representative of said identification data.

4. A system according to claim 1, in which said means for entering information concerning parking expiry time include means accessible to drivers for entering parking duration information, and means for adding the current time information to said duration.

5. A system according to claim 1, in which said means for entering information concerning the expiry of authorized parking time include means for adding a predetermined duration to the current time information, with said predetermined duration being equal to a maximum period of authorized parking.

6. A system according to claim 4, in which said parking terminal includes means for converting said entered parking duration into an amount of money, and means for subtracting said amount from the balance recorded in said information medium.

7. A system according to claim 6, in which said parking terminal includes means for comparing the time at which a card is inserted with the terminal with said stored information relating to expiry times of authorized parking and for comparing the associated identification information stored therewith with the identification information writtten in the card, and means for processing said comparisons in order to change the balance stored in said card providing the identification information of said card corresponds with properly stored identification information and providing the corresponding expiry time of authorized parking is later than the time of insertion.

8. A system according to claim 3, in which said identification data displayed on said display means is related to the identification information by a coding algorithm, with said display means being suitable for being fixed in visible manner on said vehicle.

9. A system according to claim 8, in which said means for entering information concerning parking expiry time include means accessible to drivers for entering parking duration information, and means for adding the current time information to said duration.

10. A system according to claim 9, in which said parking terminal includes means for converting said entered parking duration into an amount of money, and means for subtracting said amount from the balance recorded in said information medium.

11. A system according to claim 10, in which said parking terminal includes means for comparing the time at which a card is inserted into the terminal with said stored information relating to expiry times of authorized parking and for comparing the associated identification information stored therewith with the identification information written in the card, and means for processing said comparisons in order to change the balance stored in said card providing the identification information of said card corresponds with properly stored identification information and providing the corresponding expiry time of authorized parking is later than the time of insertion.

* * * * *